United States Patent [19]

Wheeler

[11] Patent Number: 4,612,834
[45] Date of Patent: Sep. 23, 1986

[54] CROSS SLIDE CONTOURING BOX TOOL

[76] Inventor: Harold E. Wheeler, 215 Wheelock Ave., Athens, Pa. 18810

[21] Appl. No.: 438,566

[22] Filed: Nov. 2, 1982

[51] Int. Cl.⁴ .............................................. B23B 5/44
[52] U.S. Cl. ........................................... 82/19; 29/56
[58] Field of Search ................. 82/19, 18, 1.3; 29/56, 29/57

[56] References Cited

U.S. PATENT DOCUMENTS

| | | | |
|---|---|---|---|
| 3,813,969 | 6/1974 | Wheeler | 82/19 |
| 3,847,043 | 11/1974 | Bechler | 82/19 |
| 4,479,292 | 10/1984 | Wheeler | 82/19 |
| 4,505,627 | 3/1985 | Wheeler | 82/19 |

Primary Examiner—Francis S. Husar
Assistant Examiner—Jerry Kearns
Attorney, Agent, or Firm—Edwin E. Greigg

[57] ABSTRACT

A cross slide contour forming box tool which can be applied to automatic screw machines for contour forming desired contours on the outside of a workpiece. The contour forming tool is positioned to a transverse slide perpendicular to the drive axis. The transverse slide is driven by a pin and cam groove in the face of a cam so that the contour forming tool is positioned in accordance with the shape of the cam groove. The workpiece is rotated relative to the contour forming tool and the desired contour is formed on the surface of the workpiece.

2 Claims, 3 Drawing Figures

4,612,834

CROSS SLIDE CONTOURING BOX TOOL

BACKGROUND OF THE INVENTION

This invention is directed to a contour forming device and more particularly to a contour forming device for forming contour outside surfaces behind a larger diameter.

The invention pertains to a cam operated box tool for producing multi-sided configured outer surfaces on a workpiece. It is well known that many parts used in industry are made of bar stock and turned to shape and size before being cut off in an Automatic Screw Machine. This is done because these machines have 4-6 or 8 spindles and may be performing the operations of drilling, tapping, reaming, turning, forming, etc. simultaneously thus producing workpieces at low cost.

Very often these parts need additional milling or contouring operations to complete the workpiece and this is done as a secondary operation, such as milling a flat, etc. on a conventional milling machine. This secondary operation often takes more time than the first Automatic Screw Machine operation and is expensive.

Some attempts to finish the workpiece complete on the Automatic Screw Machines by using Polygon Box Tools to turn flats, contours, etc. have been made. These tools such as described in U.S. Pat. No. 3,813,969 have been made with heavy reciprocating parts and the whole operation has been slowed to the speed at which the Polygon Box Tools would operate. The results have been fewer parts completely contoured, thus showing little overall savings. This invention is an improvement over U.S. Pat. No. 3,813,969 which overcomes the drawbacks found in the patented device and which permits operation of the polygon box tool at the speed of the driving machine such as a screw machine.

Additionally, polygon box tools have been provided in which the cam used to actuate the reciprocating parts has been a simple cam capable of moving the parts in one direction only and relying on spring pressure to move the reciprocating parts back in the other direction. Such designs limit the operating speed to the spring pressure capable of maintaining the cam follower in contact with the cam face. Such a device is found in U.S. Pat. No. 3,511,121.

SUMMARY OF THE INVENTION

This invention sets forth a polygon box tool which will operate at the speed of the driving machine and uses a grooved face cam which enables one to form different contours of a finished product by use of a screw machine for driving the polygon box tool.

In the new device reciprocating form contouring parts are actuated by a grooved face cam, giving positive control of the contouring tool at high speed. Also the new Polygon Box Tool with the reciprocating parts is much smaller and lighter than the prior art devices and can operate at a much higher speed. The new Polygon Box Tool will operate as fast as the regular set up and form contouring operations are accomplished, resulting in a finished workpiece at no increase in cost over the regular automatic time of one operation.

The new Polygon Box Tool has been developed for high speed operation and uses a transverse slide weighing about 5 oz. compared to prior art devices which weighed about 40 oz. In addition to a reduction in weight, the cam has a grooved face which allows increased speed. This has resulted in an increase in the operating cam speed from about 250 r.p.m. up to about 2000 r.p.m. which enables an Automatic Screw Machine operator to perform the form contouring operations without slowing the usual cycle time.

It is therefore an object of this invention to provide a polygon box tool which makes use of parts which permits operation at the desired speed of the driving machine.

Another object is to make a grooved face cam which is of well rounded development and extremely hard to resist the wear as required to operate contouring tools at desired speeds of the driving machine to carry out the contouring operation.

DETAILED DESCRIPTION OF THE INVENTION

Figure 1:
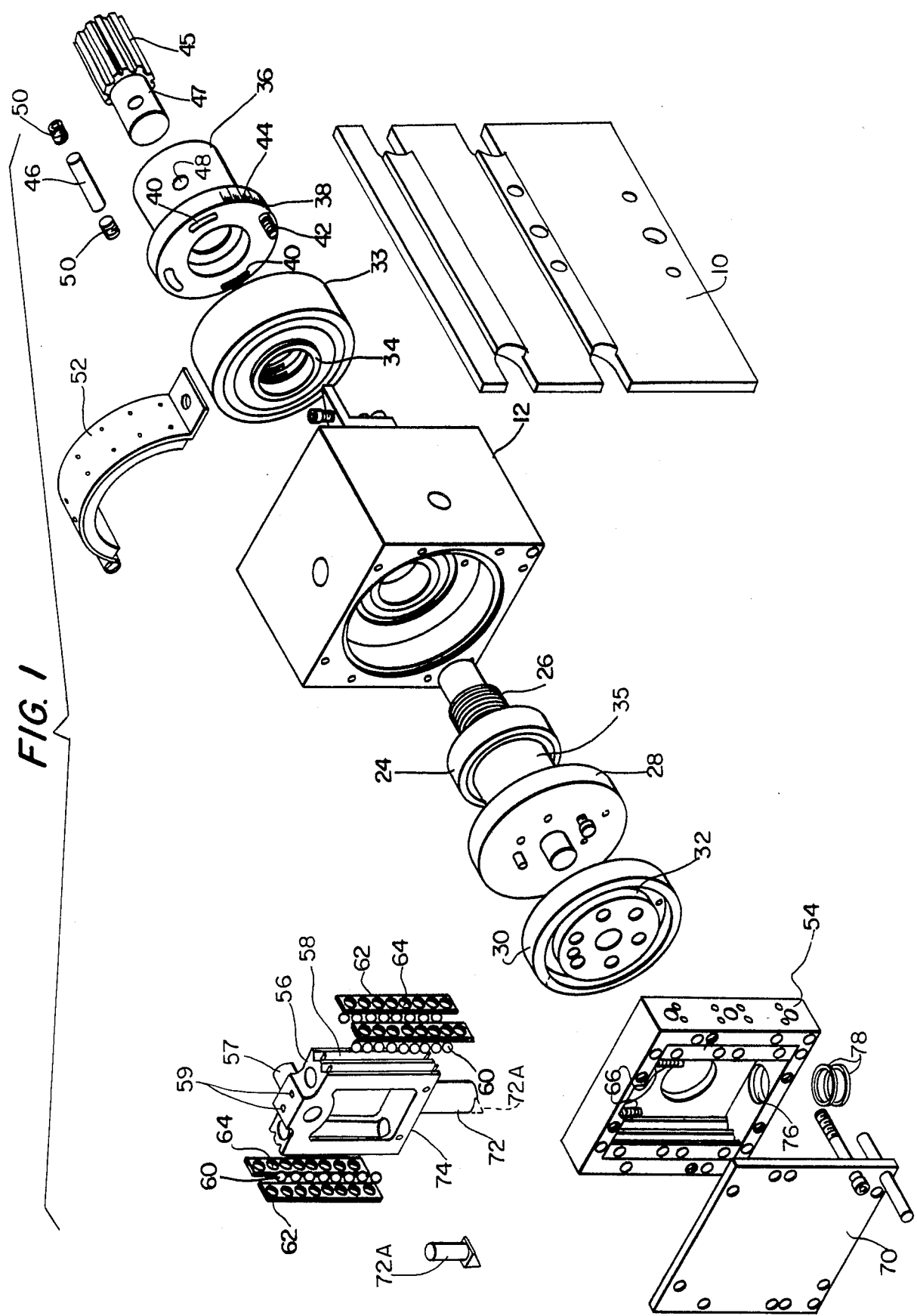
FIG. 1 shows an exploded perspective of the polygon box tool.

Now referring to the drawing, there is shown by example a polygon box tool including a mounting plate 10 to which a main housing 12 is secured. The main housing is provided with an axial aperture 14 with equal diameter shoulders 16, 18 from opposite ends and a larger diameter shoulder 20 on the front end. The shoulders 16 and 18 receive therein bearings 22 and 24 which are supported in well known inner and outer bearing races. The outer bearing race fits within the shoulders 16 and 18 with a tight fit and the inner bearing race fits with a tight fit on the small diameter end 26 of a cam shaft which is also provided with a larger diameter end 28. The larger diameter end 28 is secured to a cam 30 which is provided with a groove 32 in its face. The shape of the cam groove is designed so that a desired shape may be contour formed on the outside of a stock piece. The large diameter end 28 of the cam shaft and the grooved face cam operate within the housing 12 in the area surrounded by the larger shoulder area 20 of the housing. The small diameter end of the cam shaft is threaded and passes through the bearings in the housing 12 and threads into a threaded aperture in the first drive link 33. The first drive link is pulled toward the bearing 22 as the cam drive is threaded into the first drive link until the face 34 is against the inner bearing race of bearing 22. A spacer 35 separates the bearings from each other.

The drive link is driven by a second drive link 36 which is provided with a larger diameter end 38 which is provided with equally spaced slots 40 that extend in a circular direction. Bolts 42 pass through the slots 40 and secure the second drive 36 to the first drive link 33. The larger diameter portion of the second drive link 36 is provided with parallel lines 44 that are measured off in degrees, and the second drive link is rotatable with respect to the first drive link so that the position of the cam relative to its drive may be changed. The second drive link is secured to the end 47 of a splined drive shaft 45 by use of a shear pin 46 which passes through the aperture 48 along a diameter of the second drive link. The shear pin may be held in place by use of threaded set screws 50, one on each end. A brake band 52 is provided and secured adjacent the first drive link in order to eliminate backlash of gears and spline causing tool chatter. The brake applies only sufficient pressure to maintain a constant drive force.

Figure 2:
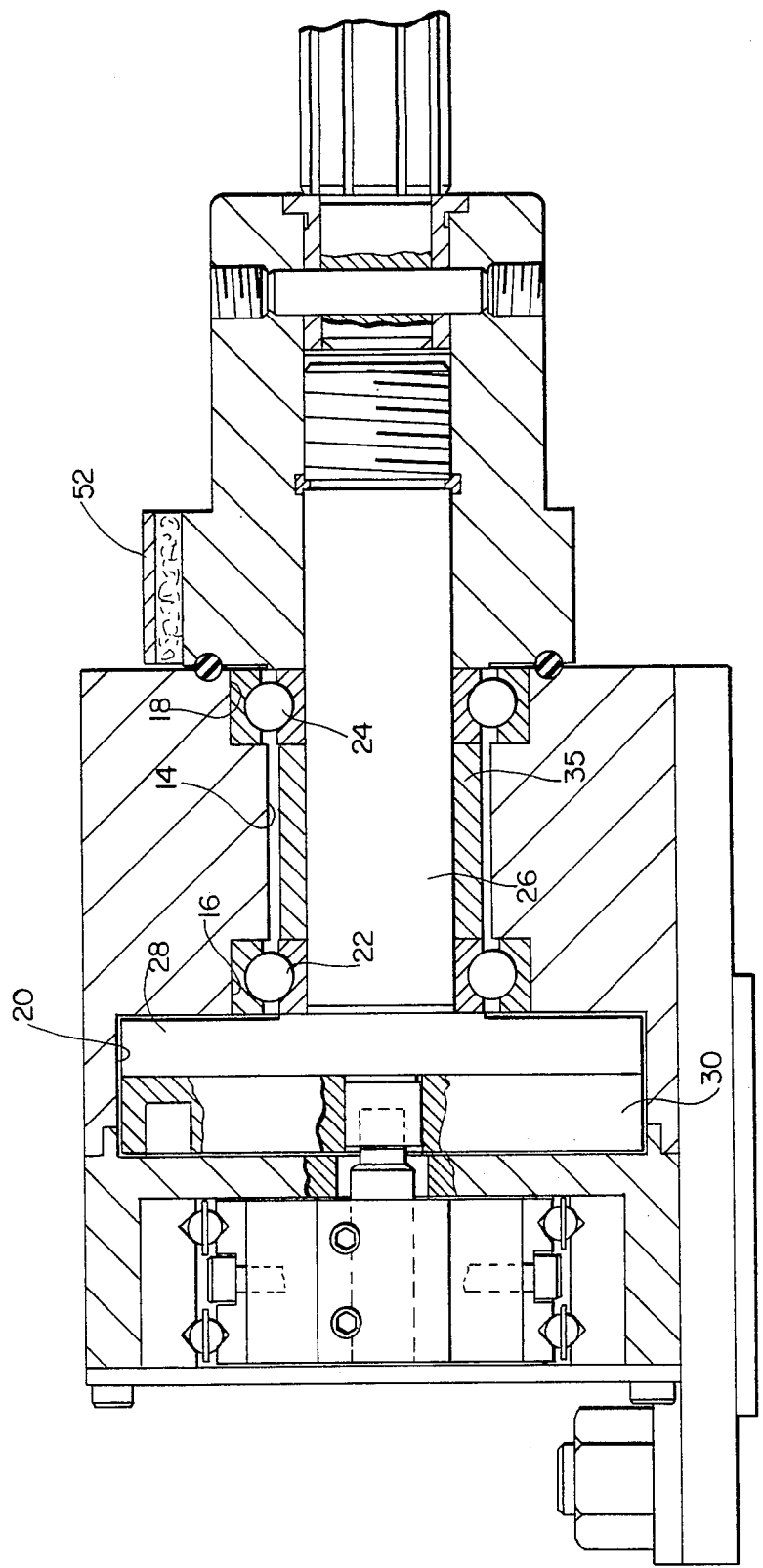
FIG. 2 shows a cross sectional view of the polygon box tool.
Figure 3:
FIG. 3 illustrates a workpiece made by the device shown in FIG. 1.

A front housing 54 is secured to the housing 12 and supports therein a transverse slide 56. The transverse slide is provided with V-shaped side grooves 58 along which ball bearings 60 are secured by use of supports 62 which are provided with apertures 64 within which each of the ball bearings rests. The transverse slide 56 fits within he front housing and is provided with a cam follower pin 57 which extends .into the cam groove 32. The pin is secured to the transverse slide by bolts 59. As the cam is rotated by the drive shaft, drive links and cam shaft, the transverse slide will reciprocate in the vertical plane, if positioned as shown in FIG. 2. Therefore it is obvious that the transverse slide is of a length which is less than the opening in the front housing 54. Extension springs 66 are provided at the top of the transverse slide for the form contouring operation. The extension springs 66 are secured at one end to the end housing 54 and at their other end to the transverse slide. The springs are provided to counteract rotational forces of the contouring form tool. A front cover 70 encloses the transverse slide by use of any well-known bolt arrangement. The contouring form tool 72a is secured within a cylindrical tool holder 72 which is secured to the transverse slide and reciprocates in aperture 76 in the bottom plate of the front housing. O-ring seals 78 are provided to prevent leakage of oil and to prevent chips from entering into the transverse slide. The cylindrical tool holder for supporting the contouring form tool extends through the aperture 76 and is secured to the transverse slide so that the contouring form tool reciprocates as the transverse slide follows the contour of the cam groove.

The transverse slide is provided with a cam follower 57 which fits into the cam groove 32. The cam groove is formed within a curved path having greater and lesser radii in order to reciprocate the contouring form tool. A workpiece, not shown, is positioned relative to the contouring form tool. In operation, the cam pin 57 follows the contour of the cam as the cam rotates which provides reciprocating movement for the contouring form tool. In order to contour form the workpiece, the workpiece is also rotated. Reciprocation of the contouring form tool forms the desired shape on the workpiece surface.

In operation for contour forming a piece of work, the polygon box tool is assembled with a groove-faced cam of the desired shape and the contouring form tool is secured to the the cylindrical tool holder which is secured to the transverse slide which extends through the aperture 76. The polygon box tool is secured to the cross slide of an automatic screw machine and driven by use of univeral joints and the workpiece is placed in a rotatable holder. The workpiece holder and screw machine drive are driven at the same rotational speed. The cam of the polygon box tool will be rotated by the screw machine drive. As the cam is rotated, the cam follower pin will follow the design of the cam, thereby reciprocating the transverse slide and contouring form tool in a vertical line as the cam rotates. As the cam is rotated to reciprocate the transverse slide and contouring form tool in a line, the workpiece is rotated at the same rotational speed in synchronism with the screw machine drive. The contouring form tool is mounted on the screw machine cross-slide and is moved toward the workpiece to form a design in accordance with the shape of the cam as the workpiece is rotated relative to the cutter. The depth of the cut is obtained by moving the polygon box tool toward the workpiece.

The second drive link 36 can be adjustably rotated relative to the first drive link 33 in order to change the orientation of the cam with respect to the drive; therefore, the orientation of the shape of the workpiece will be different. Also, the contouring form tool may be adjusted along a vertical line in order to maintain size desired. Explanation—Each cam is designed to cut one size only with straight sides and true angles.

The polygon box tool set forth herein is an improvement over U.S. Pat. No. 3,813,969. This tool uses less parts, the transverse slide is much lighter than the patented device—for instance the patented transverse slide weighs about 40 oz. whereas the present transverse slide weighs about 5 oz. The revolutions per minute has increased in accordance with the reduction of weight; i.e., the rpm has increased from about 250 rpm to about 2000 rpm. One great advantage of the improved device over the patented device is the ability of using the same cam for contour forming as well as for other operations by use of different transverse slides.

Obviously since the cam follower is in the groove on the cam face, there is no need for any additional springs because the cam follower pin will follow the groove and will be guided within the groove without the aid of springs. Thus, the transverse slide operates with less parts.

The cam shaft has been shown screw threaded into the first drive link; any other type connection may be made which would be obvious to one skilled in the art.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A polygon box tool comprising:
   a main housing;
   a front housing secured to said maind housing, said front housing including a bottom plate with a centrally aligned aperture therein;
   a lightweight transverse slide in said front housing;
   a cam in said main housing juxtaposed said front housing;
   said cam including at lest one cam face;
   a groove in said at least one cam face, said groove having a plurality of greater and lesser radii portions therein;
   said cam including a camshaft which extends through said main housing for rotating said cam in said main housing through many revolutions per second during one milling operation;
   a cam follower pin extending from said transverse slide and extending into said groove in said at least one cam face for positively reciprocating movement of said transverse slide during rotation of said cam through many revolutions per second by said camshaft, and
   means for securing a contouring form tool on said transverse slide, said means being in alignment with said aperture in said bottom plate of said transverse slide for reciprocation of said contouring form tool in said aperture by said cam follower during each rotation of said cam through said many revolutions per second.

2. A polygon box tool as claimed in claim 1 which includes a front housing cover that encloses said front housing.

* * * * *